United States Patent
Shaw et al.

(10) Patent No.: US 9,328,774 B1
(45) Date of Patent: May 3, 2016

(54) FLAT SPRING TORSIONAL VIBRATION DAMPERS

(71) Applicant: BorgWarner Inc., Auburn Hills, MI (US)

(72) Inventors: Wesley L. Shaw, Rochester Hills, MI (US); Sebastian Zindel, Darmstadt (DE); Rupert S. Tull de Salis, Heidelberg (DE)

(73) Assignee: BORGWARNER INC., Auburn Hills, ME (US)

( * ) Notice: Subject to any disclaimer, the term of this patent is extended or adjusted under 35 U.S.C. 154(b) by 0 days.

(21) Appl. No.: 14/706,454

(22) Filed: May 7, 2015

(51) Int. Cl.
*F16D 3/56* (2006.01)
*F16D 3/12* (2006.01)
*F16F 15/133* (2006.01)

(52) U.S. Cl.
CPC .. *F16D 3/56* (2013.01); *F16D 3/12* (2013.01); *F16F 15/1336* (2013.01)

(58) Field of Classification Search
CPC ........... F16D 3/12; F16D 3/56; F16F 15/1336
USPC ............................................ 464/84, 100, 101
See application file for complete search history.

(56) References Cited

U.S. PATENT DOCUMENTS

| | | | | |
|---|---|---|---|---|
| 459,325 | A * | 9/1891 | Whitney | ................. B27B 25/02 464/84 X |
| 3,924,730 | A | 12/1975 | Brown | |
| 4,465,172 | A * | 8/1984 | Gatewood | ............... F16D 13/68 464/100 X |
| 4,609,088 | A * | 9/1986 | Takeuchi | ............ F16F 15/1215 464/84 X |
| 6,176,785 | B1 * | 1/2001 | Geislinger | .......... F16F 15/1215 464/100 |
| 2012/0234131 | A1 | 9/2012 | Robinette et al. | |
| 2014/0182993 | A1 | 7/2014 | Rusch et al. | |

FOREIGN PATENT DOCUMENTS

| | | | |
|---|---|---|---|
| CH | 137290 | * | 3/1930 |
| DE | 3435917 | | 4/1986 |

* cited by examiner

*Primary Examiner* — Gregory Binda
(74) *Attorney, Agent, or Firm* — Young Basile Hanlon & MacFarlane P.C.

(57) ABSTRACT

An apparatus includes a first part, a second part that is rotatably mounted with respect to the first part, a flat spring, and one or more engaging members. The flat spring extends from a first end to a second end and is able to bend in a first direction and a second direction. The one or more engaging members are connected to the second part and engage the flat spring at a location between the first end of the flat spring and the second end of the flat spring to restrict bending of the flat spring in at least one of the first direction or the second direction.

13 Claims, 7 Drawing Sheets

US 9,328,774 B1

FLAT SPRING TORSIONAL VIBRATION DAMPERS

BACKGROUND

Torsional dampers are well known devices that reduce torque fluctuations. Torsional dampers can be used to transmit torque between components inside the primary powerflow, to reduce vibrations caused by changes in rotational speed. Torsional dampers can also be used to connect a member subjected to a torsional load to a secondary inertia outside the primary powerflow, in which case they are sometimes referred to as absorbers.

Torsional dampers and absorbers are often used in automotive applications. For example, dual mass flywheels include a torsional damper, and are an example of a torsional damper assembly.

In its simplest form, a flywheel is simply a disc of significant mass that has a high moment of inertia. One function of the flywheel is to resist changes in rotational speed. In automobile powertrains, a flywheel is connected to the crankshaft of an internal combustion engine. Thus, in an internal combustion engine, the flywheel resists acceleration and deceleration of the crankshaft. This resistance to acceleration and deceleration reduces fluctuations in the rotational speed of the crankshaft that would otherwise be caused by linear reciprocal motion of the pistons. Without the flywheel, fluctuations in rotational speed in the crankshaft would cause potentially severe vibrations.

A dual mass flywheel includes two separate flywheel parts that are connected to one another by a torsional damper. The torsional damper connects the two flywheel parts such that relative rotation between them is allowed along the axis of rotation of the flywheel, with the torsional damper resisting relative rotation of the two flywheel parts and urging them to a rotationally neutral position.

SUMMARY

One aspect of the disclosed embodiments is an apparatus that includes a first part, a second part that is rotatably mounted with respect to the first part, a flat spring, and one or more engaging members. The flat spring extends from a first end to a second end, and is able to bend in a first direction and a second direction. The one or more engaging members are connected to the second part and engage the flat spring at a location between the first end of the flat spring and the second end of the flat spring to restrict bending of the flat spring in at least one of the first direction or the second direction.

Another aspect of the disclosed embodiments is a dual mass flywheel having an axis of rotation. The dual mass flywheel includes a first flywheel part, second flywheel part that is rotatably mounted for rotation with respect to the first flywheel part around the axis of rotation, and a torsional damper. The torsional damper includes a plurality of flat springs that each extend from a first end to a second end and are each able to bend in a first direction and a second direction and a plurality groups of one or more engaging members that are each connected to the second flywheel part and engage a respective one of the flat springs at a location between the first end of the flat spring and the second end of the flat spring to restrict bending of the flat spring in at least one of the first direction or the second direction.

Another aspect of the disclosed embodiments is an automobile drivetrain that includes an engine that provides rotational driving power and a dual mass flywheel that receives the rotational driving power from the engine and has an axis of rotation. The dual mass flywheel includes a first flywheel part, a second flywheel part that is rotatably mounted for rotation with respect to the first flywheel part around the axis of rotation, and a torsional damper. The torsional damper has a plurality of flat springs that each extend from a first end to a second end and are each able to bend in a first direction and a second direction and a plurality of groups of one or more engaging members that are each connected to the second flywheel part and engage a respective one of the flat springs at a location between the first end of the flat spring and the second end of the flat spring to restrict bending of the flat spring in at least one of the first direction or the second direction.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to torsional vibration dampers. It should be understood that the dampers described herein apply to any structure in which there is a need to reduce torsional vibrations. The torsional dampers will be explained in the context of a dual mass flywheel in which the torsional damper is placed within the primary powerflow. The torsional dampers described herein could also be applied, as examples, in a dual mass flywheel where the torsional damper is placed outside of the primary power flow or in a single mass flywheel where the torsional damper is placed outside of the primary power flow.

Figure 1:
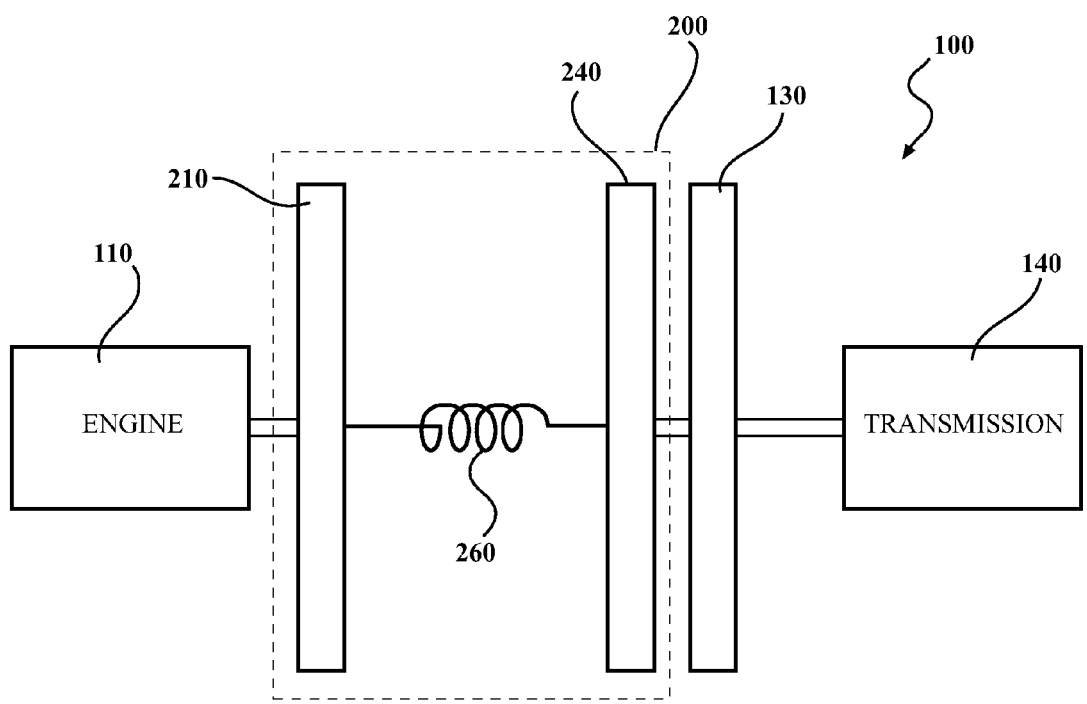
FIG. 1 is a schematic illustration showing a portion of an automobile drivetrain.

The torsional vibration dampers described herein utilize flat springs. As used herein, a flat spring is any resilient body that resists a bending moment, ideally without permanent deformation, FIG. 1 is an illustration showing a portion of an automobile drivetrain 100 that includes an engine 110, a dual mass flywheel 200, a clutch 130, and a transmission 140.

The engine 110 is conventional and can be an internal combustion engine such as a linear reciprocating piston internal combustion engine. The clutch 130 is a conventional selective torque transmission device that can be manually operated or electronically controlled. The clutch 130 can have an engaged position, in which it transmits rotational driving power, and a disengaged position, in which rotational driving power is not transmitted. In some implementations, the clutch 130 is omitted. The transmission 140 is a conventional speed and torque conversion device such as a manual transmission, an electronically controlled manual transmission, an automatic transmission, or a continuously variable transmission.

The dual mass flywheel 200 includes a first flywheel part 210 and a second flywheel part 240. The first flywheel part 210 and the second flywheel part 240 rotate on an axis of rotation in response to rotational driving power received from the engine 110. The first flywheel part 210 receives rotational driving power directly from the engine 110, such as by a connection to the crankshaft of the engine 110 that causes rotation of the first flywheel part 210 in unison with the crankshaft.

The second flywheel part 240 is connected to the first flywheel part 210 by a torsional damper 260. Rotational force is transferred between the first flywheel part 210 and the second flywheel part 240 by the torsional damper 260. However, the torsional damper 260 connects the first flywheel part 210 to the second flywheel part 240 such that relative rotation of the second flywheel part 240 with respect to the first flywheel part 210 is allowed along the axis of rotation over a limited angular range of motion. The torsional damper 260 resists this relative rotation and urges the second flywheel part 240 toward a rotationally neutral position with respect to the first flywheel part 210.

The automobile drivetrain 100 is an example of an implementation in which the dual mass flywheel 200 can be used. In this example, rotational driving power from the engine 110 is delivered to the dual mass flywheel 200 such as by a crankshaft (not shown) of the engine 110. The driving power is then provided to the clutch 130. The clutch 130, when in its engaged position, delivers the driving power to the transmission 140. Additional components (not shown) can be incorporated in the automobile drivetrain 100 to deliver the driving power from the transmission 140 to the wheels of the automobile. Other drivetrain configurations can be utilized in conjunction with the dual mass flywheel 200, including ones in which additional components are interposed between the components included in the illustrated example.

Figure 2:
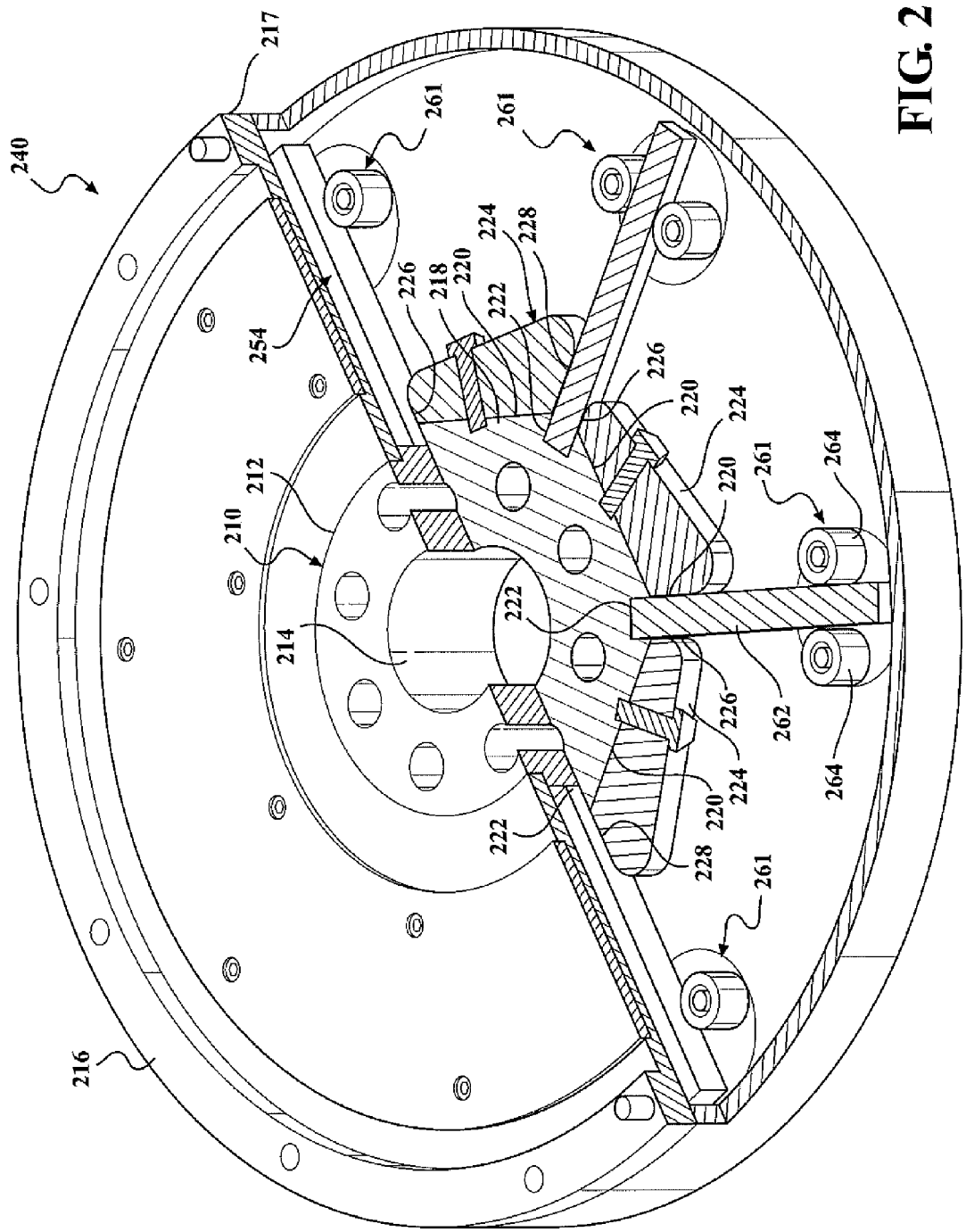
FIG. 2 is a perspective partial cutaway view showing a dual mass flywheel.
Figure 3:
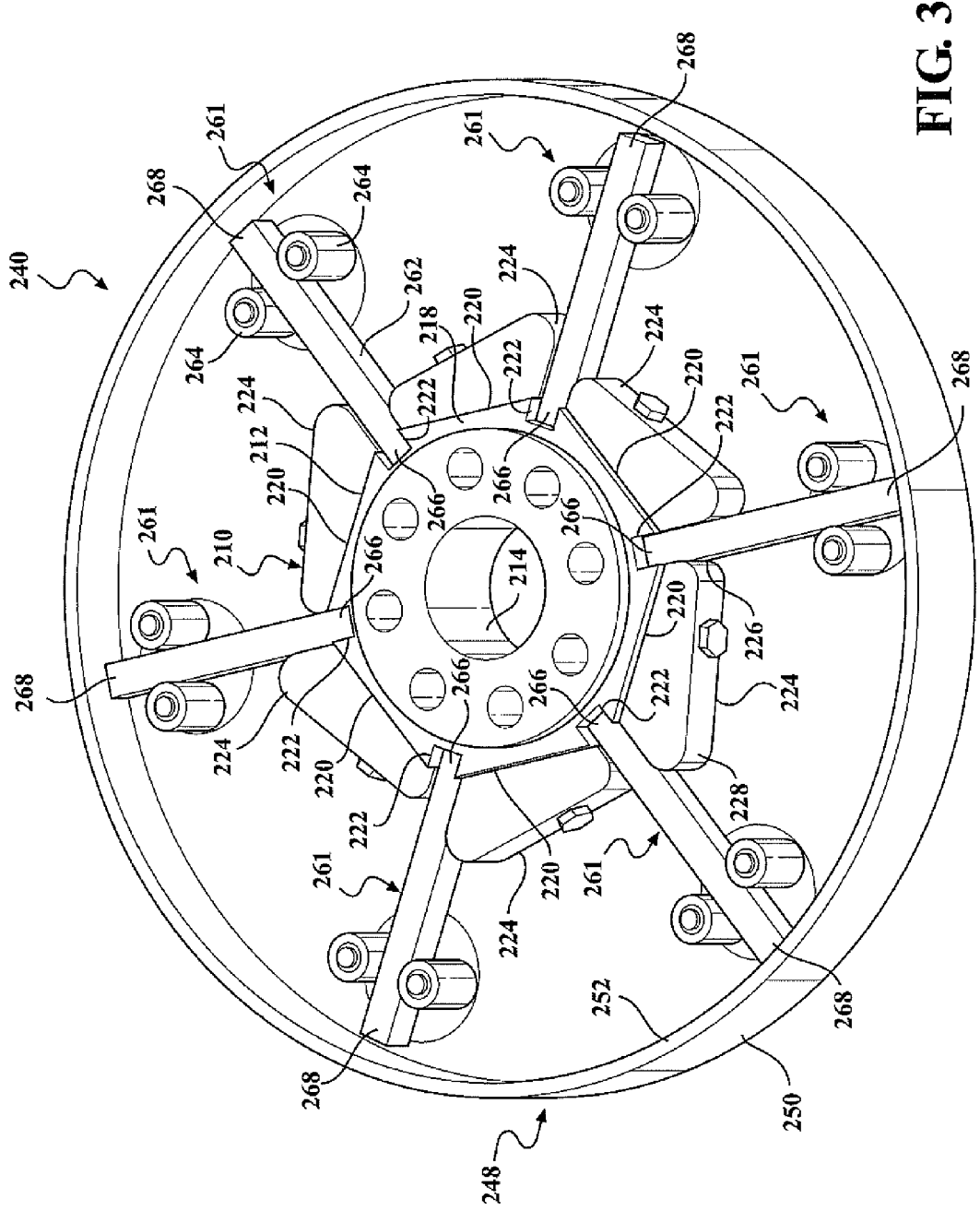
FIG. 3 is a perspective cross-section view showing the dual mass flywheel.

As shown in FIGS. 2-3, the first flywheel part 210 includes a hub 212 and an upper housing portion 216. The first flywheel part 210 also includes a plurality of asymmetric supports 224 that are connected to the hub 212.

The hub 212 has a generally annular shape and is aligned on the axis of rotation of the dual mass flywheel 200. A bore 214 extends through the hub 212 centrally along the axis of rotation. The upper housing portion 216 is a generally circular member that extends outward from the hub 212 to an outer periphery 217. At the outer periphery 217 of the upper housing portion 216, the upper housing portion 216 meets the second flywheel part 240.

The hub 212 includes a middle portion 218. The middle portion 218 can include a plurality of flat sides 220 that are located on the outer periphery of the middle portion. In the illustrated example, the middle portion 218 has six of the flat sides 220 arrayed around the axis of rotation to define a hexagonal shape for the middle portion 218. It should be understood that the middle portion 218 need not include flat sides. For example, the middle portion 218 could be circular. In implementations where the middle portion 218 does include the flat sides 220, that can be provided in a number greater than or less than six.

In order to connect the first flywheel part 210 to the torsional damper 260, the hub 212 includes a plurality of slots 222. The slots 222 are each configured to engage a respective portion of the torsional damper 260. The slots 222 can be defined on the outer periphery of the middle portion 218 of the hub 212. In particular, the slots 222 can extend from the outer periphery of the middle portion 218 toward the axis of rotation. The slots 222 could, but need not, extend in a radial direction relative to the axis of rotation, as in the illustrated example. In addition, the slots 222 could be placed at the junction between adjacent pairs of the flat sides 220, as in the illustrated example.

The asymmetric supports 224 are each connected to the hub 212. For example, the asymmetric supports 224 can each be connected to a respective one of the flat sides 220 of the hub 212. In the illustrated example, conventional fasteners are used to connect each of the asymmetric supports 224 to the hub. Other structures could be used to connect the asymmetric supports 224 to the hub 212, or the asymmetric supports 224 could be formed integrally with the hub 212.

The asymmetric supports 224 each have a first end 226 positioned adjacent to one of the slots 222 and a second end 228 positioned adjacent to another one of the slots 222. The shape of each of the asymmetric supports 224 can be selected to affect the performance characteristics of the torsional damper 260. For example, the width of each asymmetric support 224 at the first end 226 and the second end 228 can be different. The asymmetric supports 224 can engage portions of the torsional damper 260, and the differing widths at the first end 226 and the second end 228 can be utilized to achieve desired performance characteristics for the torsional damper 260. In particular, the movement of the first flywheel part 210 with respect to the second flywheel part 240 occurs in two different rotational directions. Since the widths of the first end 226 and the second end 228 of the asymmetric supports 224 are different, the asymmetric supports 224 cause the torsional damper 260 to have different response characteristics in the different rotational directions.

The second flywheel part 240 includes a lower housing portion 248, which is a generally circular member that extends from an outer periphery 250 to an inner periphery (not shown) that can be concentric to the bore 214.

At the outer periphery 250, the lower housing portion 248 includes an upstanding flange 252. In the illustrated example, the upstanding flange 252 is formed as an integral part of the lower housing portion 248. The upstanding flange 252 could, however, be formed separately and connected by conventional structures or methods.

The upstanding flange 252 defines a cylindrical shape extending along and centered on the axis of rotation. The lower housing portion 248 meets the upper housing portion 216 at the upstanding flange 252. Because of the upstanding flange 252, an interior space 254 is defined between the upper housing portion 216 and the lower housing portion 248. The middle portion 218 of the hub 212 is disposed at least partially in the interior space 254. The torsional damper 260 can also be disposed within the interior space 254.

The torsional damper 260 includes a plurality of dampening assemblies 261 that each includes a flat spring 262 and one or more engaging members such as a pair of engaging members 264. In the illustrated example, the engaging members 264 are rollers that each engage the flat spring to restrict bending of the flat spring 262 in a respective direction. Other structures could be provided as the engaging members 264 provide that the structures are able to contact the flat spring 262 and restrain its motion, as will be explained further herein.

The flat springs 262 are elongate members that are able to bend in a first direction and a second direction that are opposite one another. In this example, the first direction and the second direction are clockwise and counter-clockwise directions defined in a plane that is perpendicular to the axis of rotation. The flat springs 262 assume a neutral position when not subjected to an external force. In the illustrated example, the flat springs 262 extend in a straight line when in the neutral position. The neutral position of the flat springs can be other than straight in other implementations. When subjected to an external force, the flat springs 262 are able to deform elastically. When the external force is removed, the flat springs 262 return to their neutral positions in response to removal of the external force.

In the illustrated example, each of the flat springs 262 has a generally rectangular cross section along its respective neutral axis from a first end 266 to a second end 268. Each flat spring 262 also has a first side surface 270 and a second side surface 272 that each extend from the first end 266 to the second end 268. The flat springs 262 each extend in a radial direction relative to the axis of rotation, with the first end 266 of each flat spring 262 being positioned radially inward from the second end 268 of the respective flat spring 262. It should be understood that in alternative implementations, the flat springs 262 can have other geometries. For example, the flat springs 262 can have a constant cross section in their axial directions, can have a changing cross section in their axial directions, can be generally straight, or can be curved.

In the illustrated example, the first side surface 270 and the second side surface 272 are each engageable with a respective one of the engaging members 264. The engaging members 264 can be positioned with respect to each other so that they are on opposite sides of the flat spring 262, but at a common location along its length as measured from the first end 266 to the second end 268. In other implementations, the engaging members 264 can be arranged in a pair that do not directly oppose one another, but are located at different locations along the length of the flat spring 262, in order to tune the response of flat springs 242 differently in each of the two rotational directions.

The first end 266 of each of the flat springs 262 can be disposed in a respective one of the slots 222. The second end 268 of each of the flat springs 262 can be a free end that is connected to neither the first flywheel part 210 nor the second flywheel part 240. Each of the flat springs 262 contacts a pair of the engaging members 264 at an intermediate location disposed between the first end 266 and the second end 268 of the respective one of the flat springs 262.

The location of the engaging members 264 along the flat springs 262 affects the natural frequency of the torsional damper 260. Thus, the distance of the engaging members 264 from the first end of the flat springs 262 and from the asymmetric supports 224 can be selected to achieve a desired natural frequency.

In the description above, the engaging members 264 are described as being located at a fixed position with respect to the flat springs 262 of the torsional damper 260. In other implementations, however, the engaging members 264 can be moved, such as by an actuator. This can be used, for example, to change the natural frequency of the torsional damper 260 to approximate the natural frequency of the input torque, which can reduce the transmission of vibrations from the input side to the output side of the dual mass flywheel 200.

Figure 4:
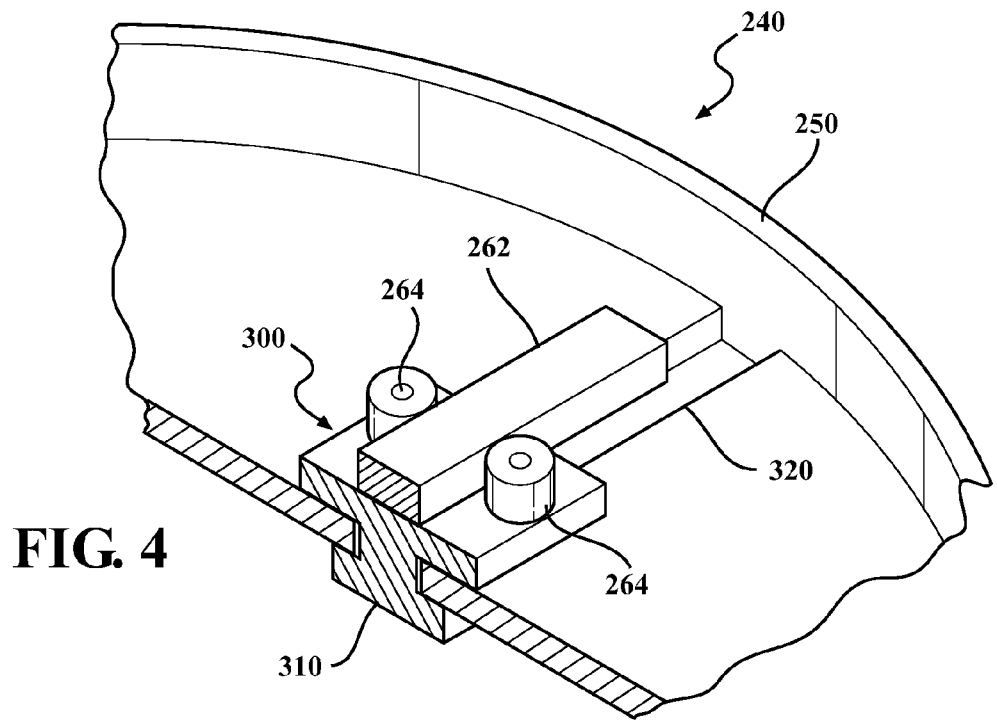
FIG. 4 is a an illustration showing a dampening assembly in which a carrier is slidably mounted in a slot.

FIG. 4 shows a dampening assembly 300. Multiple dampening assemblies 300 can be included in a torsional damper, as previously explained with respect to the dampening assemblies 261 of the torsional damper 260. The dampening assembly 300 is an example of a structure that permits the location of the engaging members 264 to be changed. It should be understood that other structures can be used to permit the location of the engaging members 264 to be changed.

In order to allow movement of the engaging members 264, the dampening assembly 300 includes a carrier 310 that is mounted in a track 320. The track 320 is defined in the lower housing portion of the second flywheel part 240. The track 320 extends radially outward relative to the axis of rotation toward the outer periphery 250. The carrier 310 and the track 320 are configured to allow the carrier 310 to slide along the track 320. Moreover, the carrier 310 can include geometric features that restrain movement of the carrier 310 to sliding motion along the track 320 in the radial direction relative to the axis of rotation.

In the dampening assembly 300, the engaging members 264 are mounted on the carrier 310. Thus, when the carrier 310 slides with respect to the second flywheel part 240, the distance between the first end 266 of the flat spring 262 and the engaging members 264 changes. This causes a corresponding change to the natural frequency of the dampening assembly 300.

Movement of the carrier can be controlled by an actuator (not shown in FIG. 4), such an electrical actuator, a hydraulic actuator, a pneumatic actuator, or a mechanical actuator.

Figure 5:
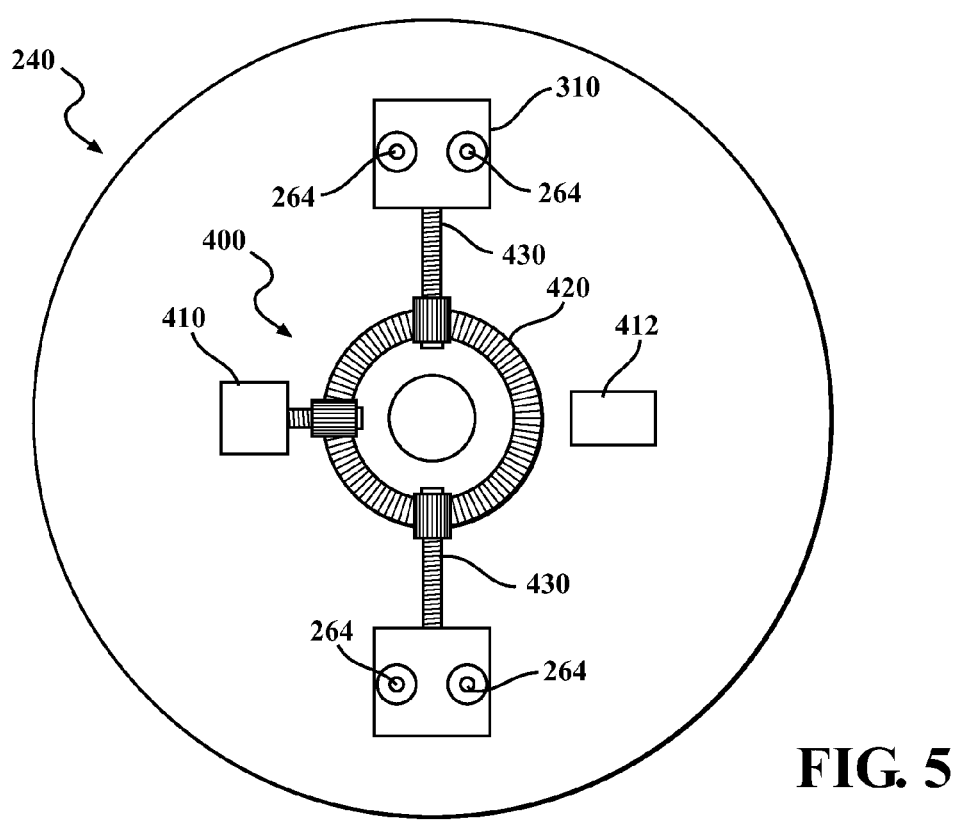
FIG. 5 is an illustration showing an actuator assembly according to a first example.

FIG. 5 shows an actuator assembly 400 that can be utilized with the dampening assembly 300 to change the position of the carrier 310 and the engaging members 264. The actuator assembly 400 is electrically operated and can be controlled by control signals to adjust the position of the engaging members 264 as desired.

The actuator assembly 400 includes an electric motor 410 that is operable to cause rotation of a bevel gear 420 that is centered on the axis of rotation. A counterweight 412 is included opposite the electric motor 410 relative to the axis of rotation to prevent imbalance. Screw actuators 430 are each driven by the bevel gear 420 using appropriate gearing. The screw actuators 430 are each threaded to a respective one of the carriers 310. The carriers 310 are restrained from rotating with respect to the lower housing portion 248 on the axis of the respective screw actuator 430, and thus are driven linearly in the radial direction in response to rotation of the screw actuators 430.

Figure 6:
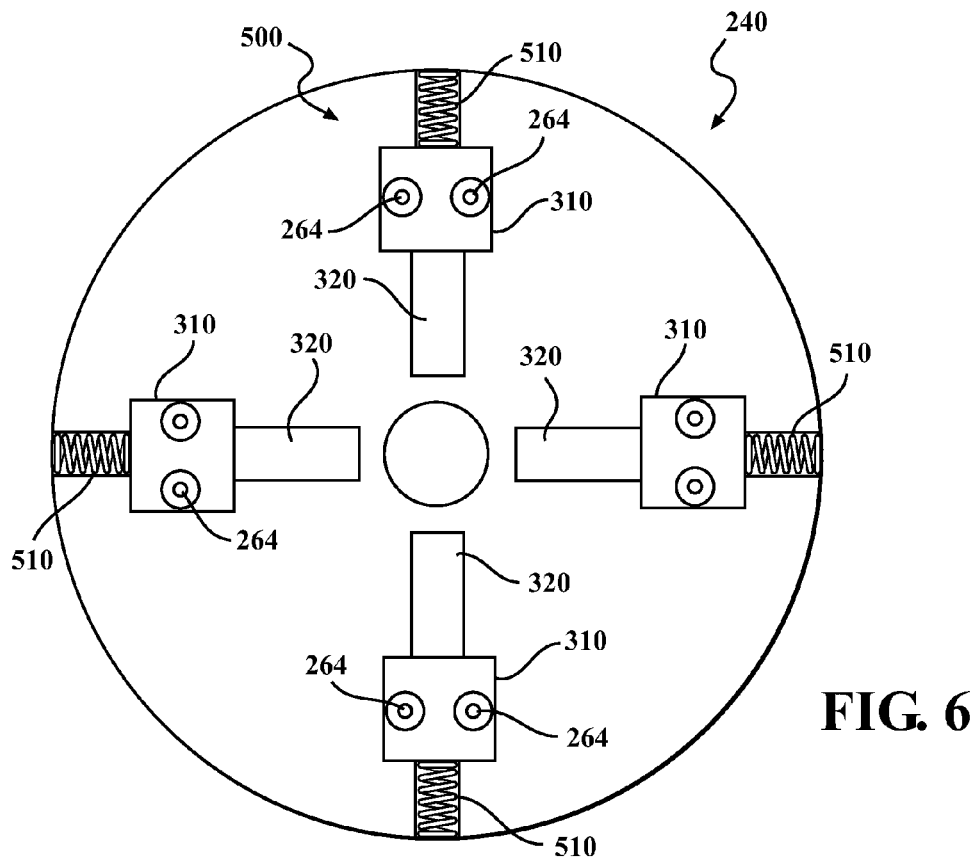
FIG. 6 is an illustration showing an actuator assembly according to a second example.

FIG. 6 shows an actuator assembly 500 that can be utilized with the dampening assembly 300 to change the position of the carrier 310 and the engaging members 264. The actuator assembly 500 is centrifugal, and causes movement of the engaging members 264 responsive to the rotational speed of the dual mass flywheel 200.

The actuator assembly 500 includes a compression spring 510 that is seated in each of the tracks 320 radially outward from a respective one of the carriers 310. As the rotational speed of the dual mass flywheel 200 increases, centrifugal force causes each of the carriers 310 to further compress the respective compression spring 510 and thus move radially outward. Decreases in rotational speed of the dual mass flywheel 200 result in the carriers 310 moving radially inward toward the axis of rotation in response to the force exerted by each compression spring 510.

Figure 7:
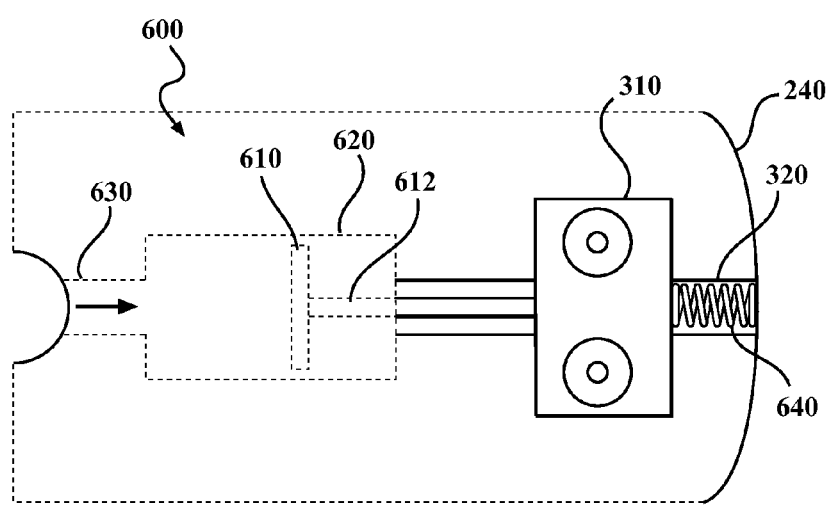
FIG. 7 is an illustration showing an actuator assembly according to a third example.

FIG. 7 shows an actuator assembly 600 that can be utilized with the dampening assembly 300 to change the position of the carrier 310 and the engaging members 264. The actuator assembly 600 is hydraulic, and causes movement of the engaging members 264 responsive to pressure applied by a source of pressurized liquid.

The actuator assembly 600 includes a piston 610 that is disposed in a chamber 620. The piston 610 is connected to the carrier 310 by a piston rod 612. A fluid supply path 630 provides pressurized fluid to the chamber 620, which causes the piston 610 to move radially outward, and causes corresponding motion of the carrier 310 and the engaging members 264. A return spring 640 resists movement of the carrier 310 in the radially outward direction. The return spring 640 can be a compression spring that is located, for example, in the track 320 radially outward from the carrier 310. When the pressure of the fluid from the fluid supply path 630 decreases, the force applied by the return spring 640 causes the carrier 310 to move radially inward.

Figure 8:
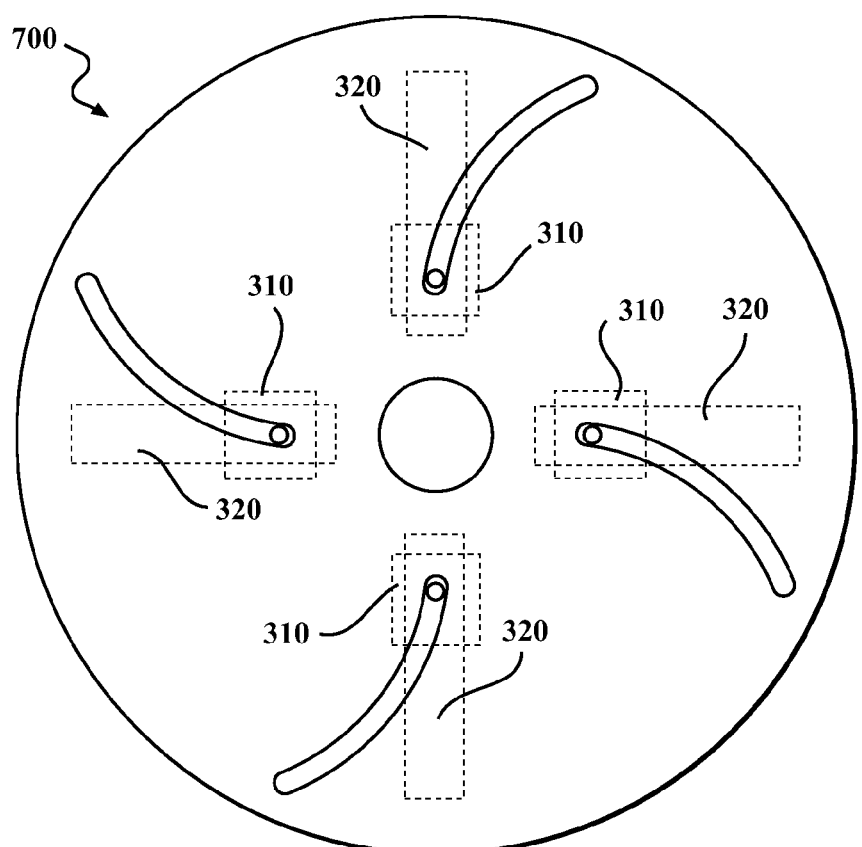
FIG. 8 is an illustration showing an actuator assembly according to a fourth example.

FIG. 8 shows an actuator assembly 700 that can be utilized with the dampening assembly 300 to change the position of the carrier 310 and the engaging members 264. The actuator assembly 700 includes a cam plate 710 that is rotated on the axis of rotation of the dual mass flywheel 200 by an actuator such as an electric, hydraulic, pneumatic, or centrifugal actuator. Cam slots 720 are formed in the cam plate 710. A pin 730 is attached to each of the carriers 310 and extends into a respective one of the cam slots 720. Since the carriers 310 are restrained to move linearly in the tracks 320, rotation of the cam plate 710 forces the carriers 310 to move along the tracks 320 as a result of interaction of the cam slots 720 with the pins 730. In the illustrated example, the carriers 310 are at one end limit of travel closest to the axis of rotation. Counter-clockwise rotation of the cam plate 710 with respect to the tracks 320 will cause the carriers 310 to move radially outward along the tracks 320. Subsequent clockwise rotation of the cam plate 710 will cause the carriers 310 to move radially inward along the tracks 320.

Figure 9:
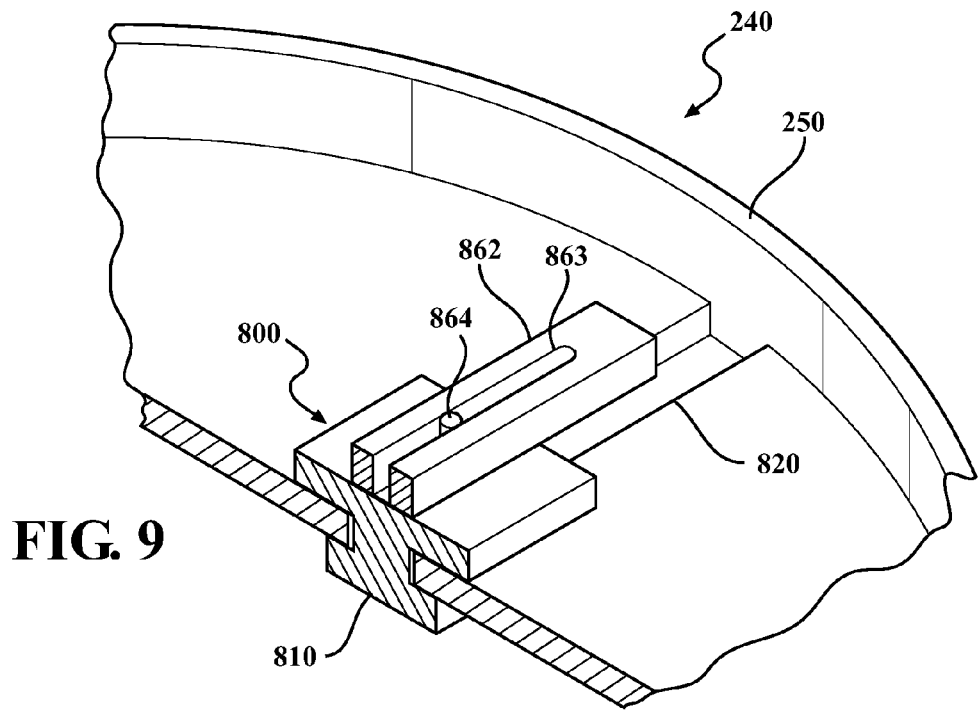
FIG. 9 is a an illustration showing an alternative dampening assembly in which an engaging member is disposed in a slot formed in a flat spring.

FIG. 9 is an illustration showing an alternative dampening assembly 800 in which a carrier 810 is mounted in a track 820. An engaging member 864 is disposed on and extends upward from the carrier 810. As an example, the engaging member 864 can be a pin. Other types of structures can be used. A flat spring 862 is similar to the flat spring 262 that was previously described, except that a recess such as a slot 863 is formed in or through the flat spring 862. The engaging member 864 extends into the slot 863. As with the flat spring 262, the flat spring 862 is able to bend in a first direction and a second direction that are opposite one another. In this example, the first direction and the second direction are clockwise and counter-clockwise directions defined in a plane that is perpendicular to the axis of rotation. Because the engaging member 864 is disposed in the slot 863, the engaging member 864 is able to restrict bending of the flat spring 862 in both the first direction and the second direction by engagement of the engaging member with the interior surfaces of the flat spring 862 that define the slot 863.

Figure 10:
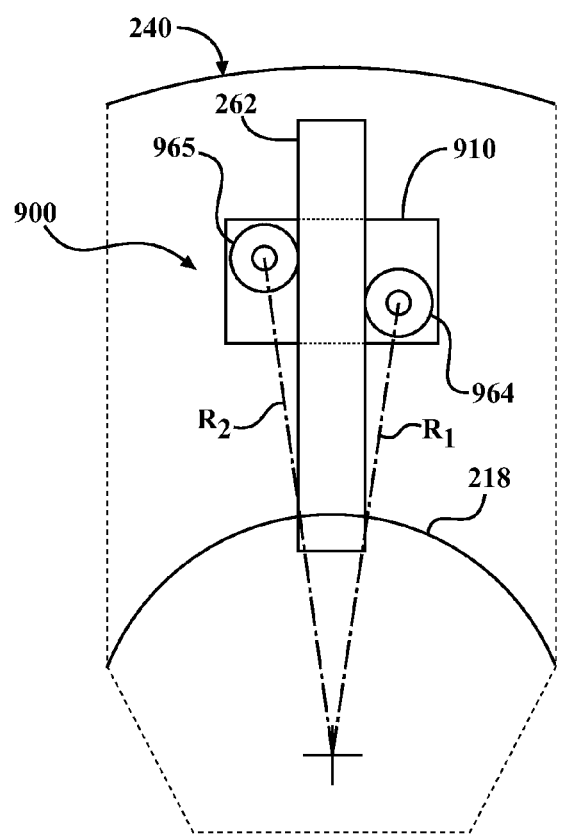
FIG. 10 is a an illustration showing an alternative dampening assembly in which a first engaging member and a second engaging member are located are different distances from the axis of rotation.

FIG. 10 is an illustration showing an alternative dampening assembly 900. A first engaging member 964 and a second engaging member 965 are disposed on a carrier 910 and are located on opposite sides of the flat spring 262. The first engaging member 964 and the second engaging member 965 are located at differing distances from the axis of rotation and thus differing distances from the ends of the flat spring 262. In particular, the first engaging member 964 is located on a first side of the flat spring 262 at a first distance R1 from the axis of rotation and the second engaging member 965 is located on a second side of the flat spring 262 at a second distance R2 from the axis of rotation, where R1 is not equal to R2. The differing distances allow for different dampening characteristics to be obtained in the first direction and the second direction.

In operation, the dual mass flywheel 200 is utilized to dampen rotational vibrations by allowing relative movement of the first flywheel part 210 with respect to the second flywheel part 240 under the influence of a torsional damper that includes flat springs 262, wherein the flat springs 262 resist rotation of the first flywheel part 210 with respect to the second flywheel part 240. In some implementations, the positions of engaging members 264 are changed to cause a corresponding change in the natural frequency of the torsional damper.

While the disclosure has been made in connection with what is presently considered to be the most practical and preferred implementation, it should be understood that the disclosure is intended to cover various modifications and equivalent arrangements.

The invention claimed is:

1. An apparatus, comprising:
   a first part;
   a second part that is rotatably mounted with respect to the first part;
   a flat spring that extends from a first end to a second end, and is able to bend in a first direction and a second direction, with the first end of the flat spring being positioned radially inward from the second end of the flat spring; and
   one or more engaging members that are connected to the second part and engage the flat spring at a location between the first end of the flat spring and the second end of the flat spring to restrict bending of the flat spring in at least one of the first direction or the second direction.

2. The apparatus of claim 1, wherein the flat spring resists rotation of the first part with respect to the second part.

3. The apparatus of claim 1, wherein the flat spring is operable to bend relative to a neutral position in response to application of an external force and return to the neutral position upon removal of the external force.

4. The apparatus of claim 1, wherein the flat spring is connected to the first part at the first end of the flat spring.

5. The apparatus of claim 4, wherein the second end of the flat spring is a free end.

6. The apparatus of claim 1, wherein each engaging member from the one or more engaging members is a roller bearing.

7. The apparatus of claim 1, wherein the flat spring extends in a radial direction relative to an axis of rotation of the first part with respect to the second part.

8. The apparatus of claim 1, wherein the first part includes a hub and the first end of the flat spring is connected to the hub.

9. The apparatus of claim 1, wherein the first part includes a hub and the first end of the flat spring is disposed within a slot that is formed in an outer periphery of the hub.

10. An apparatus, comprising:
    a first part;
    a second part that is rotatably mounted with respect to the first part;
    a flat spring that extends from a first end to a second end, and is able to bend in a first direction and a second direction;
    one or more engaging members that are connected to the second part and engage the flat spring at a location between the first end of the flat spring and the second end of the flat spring to restrict bending of the flat spring in at least one of the first direction or the second direction; and
    an actuator assembly that is operable to move the one or more engaging members with respect to the second part.

11. The apparatus of claim 10, wherein the actuator assembly is operable to move the one or more engaging members toward and away from an axis of rotation of the first part with respect to the second part.

12. An apparatus, comprising:
a first part;
a second part that is rotatably mounted with respect to the first part;
a flat spring that extends from a first end to a second end, and is able to bend in a first direction and a second direction;
a first engaging member that is connected to the second part and engages a first side of the flat spring at a location between the first end of the flat spring and the second end of the flat spring to restrict bending of the flat spring in the first direction; and
a second engaging member that is connected to the second part and engages a second side of the flat spring at a location between the first end of the flat spring and the second end of the flat spring to restrict bending of the flat spring in the second direction.

13. The apparatus of claim 12, wherein the first engaging member is a first roller bearing and the second engaging member is a second roller bearing.

\* \* \* \* \*